UNITED STATES PATENT OFFICE.

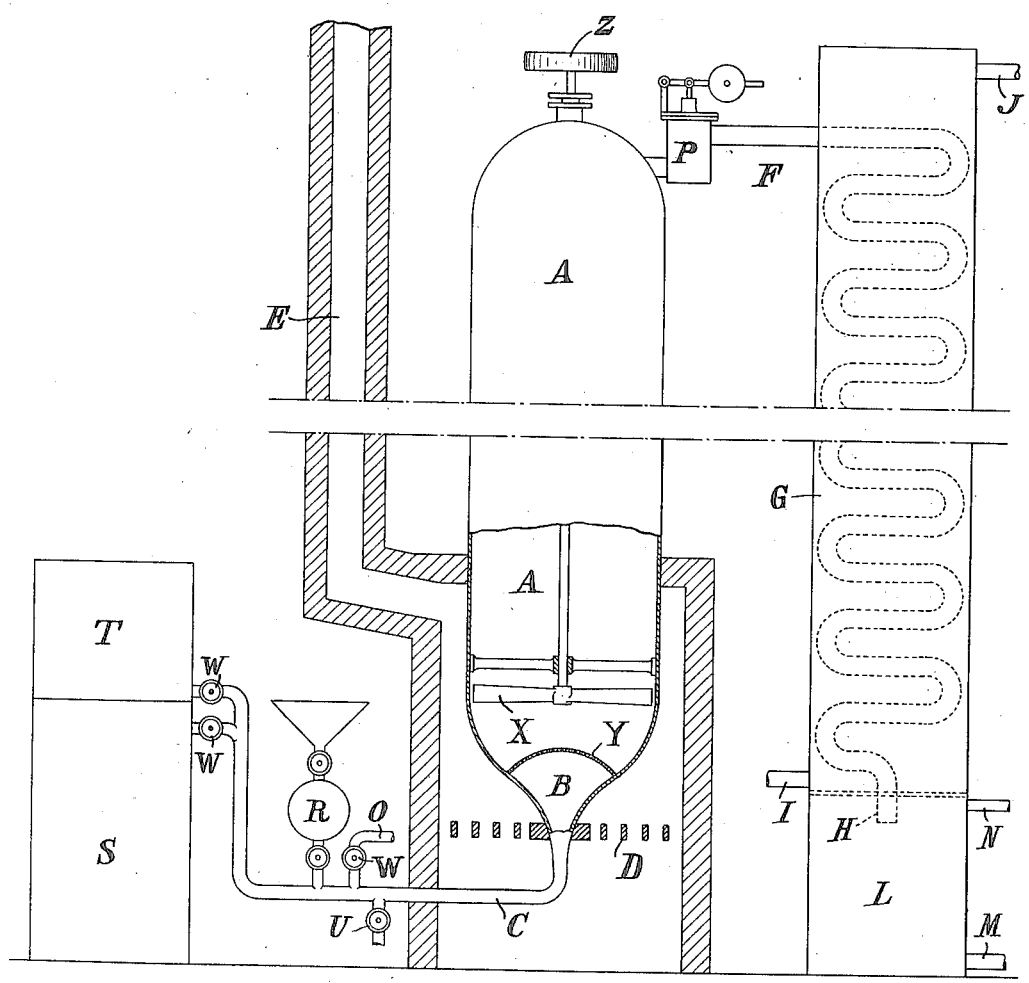

WILLIAM P. THOMPSON, OF BIRKENHEAD, ENGLAND.

DISTILLATION OF PETROLEUM.

1,160,670.  Specification of Letters Patent.  Patented Nov. 16, 1915.

Application filed May 9, 1913. Serial No. 766,552.

*To all whom it may concern:*

Be it known that I, WILLIAM PHILIPS THOMPSON, a subject of the King of Great Britain, residing at Birkenhead, in the county of Chester, in the Kingdom of England, have invented certain new and useful Improvements in the Distillation of Petroleum, of which the following is a specification.

Sabatier and Sanderen's classical investigations show that if vapors of acetylene and one or two other unsaturated hydrocarbons are passed over freshly formed finely divided metallic nickel at the requisite temperature, ethane and other saturated hydrocarbons result, but it was never suspected until lately that a catalyte such as finely divided freshly reduced nickel would not be poisoned or made inoperative at once if brought in contact with liquid oleaginous substances.

Normann in English Patent Specification No. 1515 of 1903, proposed converting unsaturated fatty acids or their glycerids into saturated compounds by causing their vapors, together with hydrogen, to pass over finely divided platinum, iron, cobalt, copper, or nickel, especially the latter, and he suggested precipitating the metallic catalyte on the surface of pumice stone or asbestos. He also suggested exposing the fat or fatty acid in the liquid condition to the action of hydrogen and the catalytic substance. Some of the best chemists in England and on the Continent, however, entirely failed for several years to obtain a good result by this process, though it is now largely at work. Also for long it has been known that badly colored and evil smelling animal vegetable and mineral oils have been purified by filtering them through fullers' earth, animal charcoal and other finely divided mineral matter, and that the purification is assisted by the presence of hydrogen.

Now my invention is designed to adapt the Normann process of saturating unsaturated fatty acids to the production of more saturated lower hydrocarbons from petroleum, and for this purpose I distil a mixture of petroleum with hydrogen and freshly reduced nickel, such as that used by Normann. This Normann catalyte is best made by reducing the oxid nitrate or easily reduced organic salt of nickel, such as the carbonate, acetate or formate by means of hydrogen, preferably at a temperature of 320 to 350° C. for from half an hour to one hour. It has also been proposed to make catalytic nickel by treating finely divided formate of nickel with purified water gas. This could probably be effected by passing formate of nickel powder at once into the still in my process. The catalyte is placed in the hot cracking still, immersed in the hydrocarbon and purified water gas, or pure hydrogen is passed through in large volume, and with strong pressure and agitation. The gas and vapor resulting are passed to the condensers and the residual gases if still rich in hydrogen can be passed through the still again, but, (especially if the hydrogen be nearly exhausted), these gases can be used as fuel to heat the still, or otherwise. It has also been known for many years that heavy petroleums can be split up, or as it is technically termed, cracked, into lighter hydrocarbons and heavy residues, by distilling them with or without a strong current of superheated steam or neutral gas in stills, the upper part of which is exposed to the atmosphere, so that the less volatile hydrocarbons are constantly being condensed and run back while the lighter hydrocarbons alone escape with the neutral gases to the condensing apparatus.

Now my invention consists in a combined catalytic and cracking process, whereby a vastly larger yield of the lighter hydrocarbons can be obtained from petroleum or other heavier hydrocarbons, the products being the lighter liquid members of the series $CnH_2n+2$ more especially $C_6H_{14}$ (usually known in England as petrol) gasolene or the like, and the process consists in placing in the cracking still with the petroleum a small percentage of the finely divided catalyte, and at the same time violently agitating with a current of free hydrogen with or without gases or vapors, so as to create a powerful agitation through the entire material, and thus very quickly draw off the lighter hydrocarbon thereby formed. The agitation is preferably further increased by a mechanical agitator.

Of the gases which can be used, I prefer purified water-gas consisting only of carbonic oxid hydrogen and nitrogen, or pure nitrogen only. The carbonic oxid and nitrogen are of no use in the process except perhaps to increase the agitation by reason of bulk but I use purified water gas as the cheapest material containing free hydrogen, and its residual gases can be used as fuel under the still.

Among the precautions which must be taken are that there shall be no anti-catalyte such as a halogen, sulfur or arsenic in the petroleum or in the catalyte or in the gases, but the petroleum unless remarkably pure should be purified by treating with acid and alkali in the usual manner, and deprived of its sulfur and chlorin if present.

Incomparably the best catalyte so far discovered is finely divided nickel. Among the numerous known processes for obtaining this, what appears to be best for this purpose is, reducing the pure nitrate or an organic salt of nickel to an oxid by heating it in any ordinary manner at the lowest practical temperature, and then deoxidizing the oxid by means of hydrogen at about 300 to 320 degrees centigrade, or in the case of organic salts of nickel treating them with the hydrogen at once. After treatment for about an hour at this temperature the nickel is found to be pure finely divided metal, and as this is pyrophoric, and would therefore take fire, and burn, if exposed to the air, it is passed into the still, by mixing in a fine powder with hot petroleum, and pumping it in. As it is best to have a continuous or frequent intermittent current of petroleum constantly entering the still to make up the distillate, it is very easily passed in in this manner.

Another known plan for making the catalyte is to use purified water-gas and pass formate or other organic salt of nickel mixed with petroleum into the still. The purified water-gas carries on the agitation which can also be assisted with advantage by an agitator in the still, as the more agitation the better. The organic acid is driven off leaving nickel in an almost colloid state of fineness in the petroleum. The hydrogen being absorbed the carbonic oxid passes off with the distillate, and can be used in the ordinary manner for the formation of formate of nickel by passing it over a suitable salt of nickel at a sufficiently high temperature preferably 320° to 350° centigrade.

Almost any still at present used for cracking petroleum can be employed, but we prefer a high cylindrical still with the bottom sloping downward to the center as a sort of inverted cone passing through the grate.

The drawing is a diagrammatic sectional elevation of my apparatus partly in section.

In this, A is a very high cracking still having a conical bottom B ending in a pipe C, through which the hydrogen or gases and the raw petroleum mixed occasionally with catalyte are forced. D is the fire grate, E the chimney, F a pipe leading to G the condenser, having weighted valve P and H a pipe from the condenser into the separator L. From this separator the light liquid hydrocarbons are carried off by pipe M, while the gases escape through the pipe N, from which they can be pumped to the pipe C, through pipe O, or passed up through the grate D or used in any other convenient manner.

I is the inflow of cold water to the still, and J the exit carrying away the hot water. R "shot-flask" device for admitting catalyte. S accumulator or source of hydrogen under pressure. T accumulator or source of petroleum under pressure, U blow off cock, W W other nonreturn stop valves to regulate quantity or shut off, X stirrer, Y finely perforated rose.

The gases and the petroleum are pumped up into the still entering through pipe C. After a time, the residue in the still becomes too thick for further use. It could then be forced out through the bottom orifice and mixed with benzol or other light spirit to make it more liquid. The catalyte is washed with benzol filtered or settled out from it, and is returned to the still, or if somewhat carbureted or inert sent to be revivified. The light spirit can be then distilled from the residue, and the latter can be used for almost any purpose for which astaki is at present employed, such as burning under boilers or for making heavy hydrocarbons.

The best temperature and pressure for the still varies with the product required. These temperatures have been thoroughly ascertained for each variety of product in ordinary cracking, and the same temperatures are required in this process. As regards the amount of catalyte used it is preferably from half to two per cent. of the contents of the still except when formate or other organic salt of nickel is passed into the still when a somewhat less quantity will do but the more catalyte employed the quicker the hydrogenization.

I declare that what I claim is:—

1. The process of obtaining lighter hydrocarbons such as gasolene from raw petroleum or like hydrocarbons, which consists in first purifying the petroleum from matters poisonous to the catalyte employed, cracking the petroleum, and at the same time introducing into the liquid petroleum a strong current, under pressure, of hydrogenizing gases in presence of finely divided nickel catalyte.

2. The improvement in the process of cracking petroleum or other like hydrocarbons, which consists in adding to the liquid hydrocarbons in the cracking still, finely divided freshly reduced nickel and passing hydrogen through the mixture with violent agitation with long contact between the nickel and liquid hydrocarbon.

3. The improvement in the process of cracking petroleum or other like hydrocarbons, which consists in adding finely divided freshly precipitated nickel catalyte to liquid hydrocarbon in the still, and at the same time passing through the still a strong current of hydrogen with other inert gases or vapors, whereby the gases themselves cause a violent agitation.

4. In the process of cracking petroleum or other like hydrocarbons, cracking the liquid in presence of finely divided nickel catalyte and purified water-gas, with violent agitation.

5. The continuous process of cracking petroleum or other like hydrocarbons, which consists in passing the hydrocarbons together with finely divided suitable catalyte, and a strong current of hydrogen with or without inert gases into the still, using violent mechanical agitation, and from time to time adding fresh petroleum.

6. The improvement in the process of cracking petroleum or like hydrocarbons, which consists in purifying the hydrocarbons from sulfur and asphalt and passing water-gas also purified from sulfur and arsenic compounds through such hydrocarbons at a high temperature in a cracking still in the presence of suitable finely divided catalyte.

7. The improvement in the process of cracking petroleum or other like hydrocarbons, which consists in passing into the petroleum during the operation of cracking, hydrogen and inert gases in the presence of suitable finely divided catalyte, with mechanical agitation as well as the agitation caused by the current of gases.

In witness whereof, I have hereunto signed my name this 30th day of April 1913, in the presence of two subscribing witnesses.

W. P. THOMPSON.

Witnesses:
HERBERT WILLIAMS,
J. W. MANTUEDEF.